United States Patent [19]
Colao

[11] 3,881,810
[45] May 6, 1975

[54] LARGE FIELD LIGHT MODULATOR
[75] Inventor: Angelo A. Colao, Bedford, Mass.
[73] Assignee: Sanders Associates, Inc., Nashua, N.H.
[22] Filed: Nov. 12, 1973
[21] Appl. No.: 415,048

[52] U.S. Cl. ............. 350/285; 250/237 R; 350/167; 350/266
[51] Int. Cl. .............................................. C02f 1/30
[58] Field of Search ......... 250/237 R; 350/167, 266, 350/272, 285

[56] References Cited
UNITED STATES PATENTS
1,686,525   10/1928   House ................................ 350/272
3,421,805   1/1969   Rowland ......................... 350/167 X Primary Examiner—Ronald L. Wibert
Assistant Examiner—F. L. Evans
Attorney, Agent, or Firm—Louis Etlinger; Richard I. Seligman

[57] ABSTRACT

Apparatus for modulating extended sources of light comprises in one embodiment first and second cylindrical lens arrays disposed back-to-back and moved relative to each other.

9 Claims, 11 Drawing Figures

LARGE FIELD LIGHT MODULATOR

BACKGROUND OF THE INVENTION

Prior to the present invention, modulation of extended sources of light was achieved by using either Moire grids or mechanical shutters.

A two grid Moire is only 50 percent efficient and even with the addition of a third grid the maximum efficiency obtainable is only 67 percent. Furthermore, driving a three grid Moire requires complex mechanical configuration and the modulation waveform is complex.

Mechanical shutters have their shortcoming in that they are frequency limited for large light sources.

SUMMARY OF THE INVENTION

Accordingly, it is an object of this invention to provide an improved large field light modulator.

It is another object of this invention to provide a large field light modulator having improved efficiency.

It is a further object of this invention to provide a large field light modulator having a high modulation frequency capability.

Briefly, modulation of extended sources of light is achieved in one embodiment by the use of cylindrical lenses arrayed in a sheet to provide a prescribed energy pattern that can be modulated with an identical number of like cylindrical lenses.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
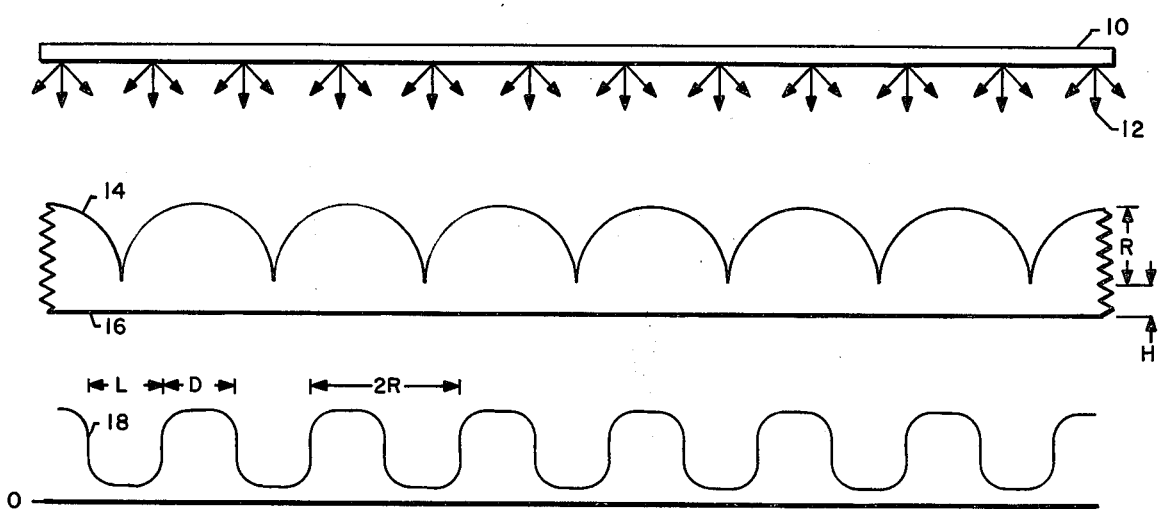
FIG. 1 is an illustration of a basic arrangement of an extended light source cylindrical lens array and typical energy distribution pattern along the flat surface of the lens array.

Referring now to FIG. 1, there is illustrated thereby a cylindrical lens array for use in a large field light modulator. Light 12 from a multi-dimensional light source 10 is collected by a cylindrical lens array 14. For clarity, a one-dimensional array is shown in this figure. The collected light provides an energy distribution pattern along the flat surface 16 of the lens array as shown typically by waveform 18.

This distribution is controlled by properly choosing the dimensions of $R$ and $h$ and the material from which the cylindrical lens is made. Dimension $d$ of the distribution pattern is controlled by the dimensions of $R$ and $h$. The selection of the dimension $R$ is made by the designer in accordance with the desired energy distribution pattern since the distance between peaks of the energy distribution pattern is equal to $2R$. The dimension $h$ is related to the index of refraction of the material used and is chosen to allow the maximum amount of energy to fall within the space $d$. The lenses may be made from any material which will pass the radiation from the light source; as for example, glass or quartz for visible light.

Figure 2:
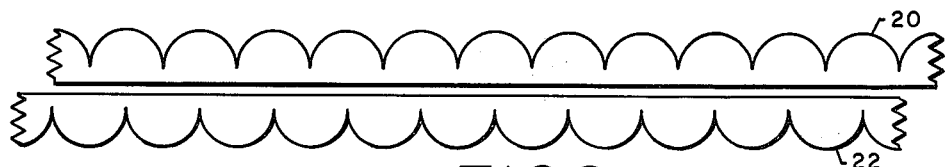
FIG. 2 is an illustration of a basic modulator using the cylindrical lens array of FIG. 1.

Light modulation occurs when two cylindrical lens arrays similar to that of FIG. 1 are placed back-to-back and moved relative to each other as shown in FIG. 2 where there is illustrated a cylindrical lens array 20 and positioned back-to-back thereto another cylindrical lens array 22. It is desired to keep the spacing between the arrays 20 and 22 at a minimum.

Figure 3:
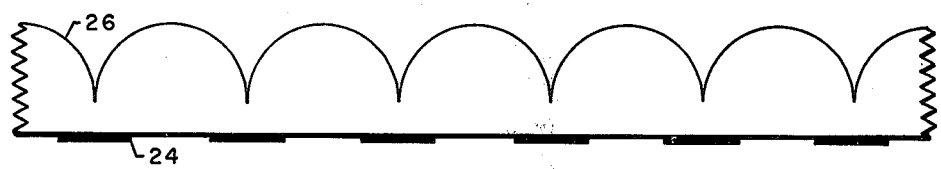
FIG. 3 is an illustration of an alternate cylindrical lens array for increasing modulation depth of the energy pattern along the field.

Further improvement of the cylindrical lens arrays 14, 20 and 22 of FIGS. 1 and 2 can be made by depositing an opaque and/or a reflective coating in the low energy regions of the lens arrays 1 (see FIG. 1). This is shown in FIG. 3 wherein coatings 24 are applied to the flat surface of the lens array 26 in the low energy region thereof. The energy distribution pattern shown in FIG. 3 below the cylindrical lens array 26 illustrates this improvement wherein the constant level of the energy distribution pattern 18 of FIG. 1 is eliminated.

Figure 4:
FIG. 4 is an illustration of another modulator using the cylindrical lens array.

An embodiment of a large field light modulator wherein one of the cylindrical lens arrays is eliminated is shown in FIG. 4 and comprises a cylindrical lens array 30 having coating zones 32 thereon equivalent to coating zones 24 of FIG. 3. Arranged to operate in conjunction with lens array 30 is a transparent member 34 having a plurality of coatings 36 thereon. The coatings 36 cover the surface in increments equal to dimension $d$ of FIG. 1. Modulation occurs when members 34 and 30 are moved relative to each other.

Figure 5:
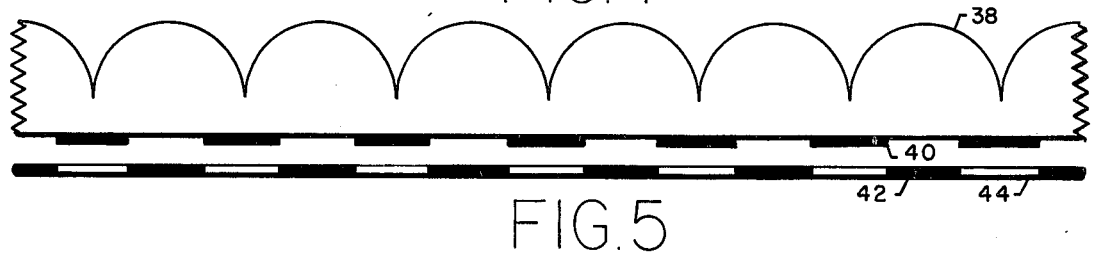
FIG. 5 is an illustration of a further modulator using the cylindrical lens array.

Another embodiment is illustrated in FIG. 5 wherein cylindrical lens array 38 having coatings 40 thereon cooperates with a member 42 which is opaque and has slots 44 therein. Again in this embodiment modulation occurs when the members 42 and 38 are moved relative to each other.

Figure 6A:
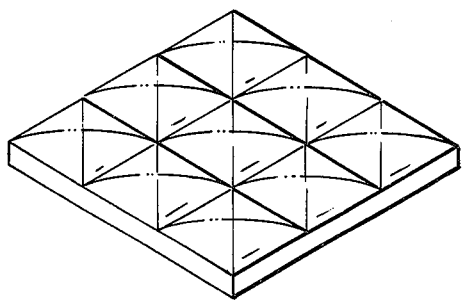
FIG. 6A–C are illustrations of two-dimensional cylindrical lens arrays.
Figure 6B:
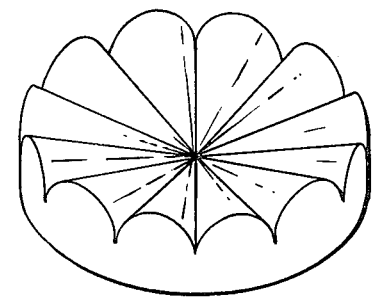
Figure 6C:
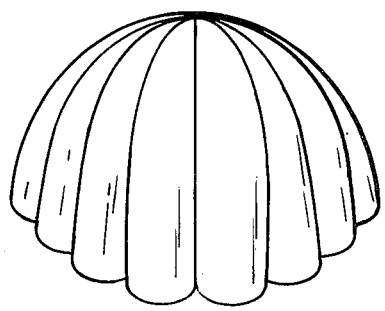

Other modulators employing two-dimensional cylindrical lens arrays are illustrated in FIGS. 6A, 6B and 6C. Two-dimensional polygonal orientation of lenses can be used to provide particular spatial energy distributions for use in the modulation of light. FIG. 6A represents a square or rectangular two-dimensional lens array while FIGS. 6B and 6C represent other two-dimensional lens arrays.

Figure 7:
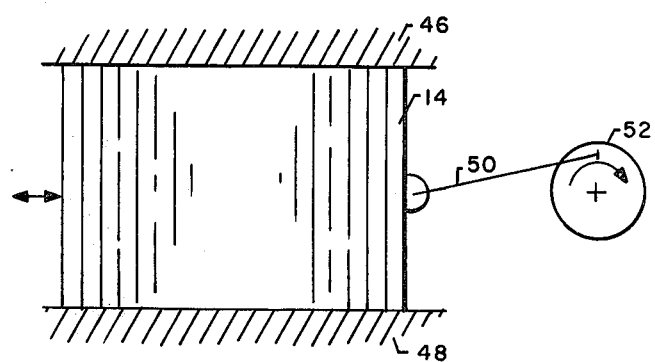
FIG. 7 is an illustration of a drive means for the lens array of FIG. 1.

FIG. 7 illustrates schematically one method of driving a lens array like that shown in FIG. 1. The cylindrical lens array 14 is disposed for linear motion within a pair of bearings 46 and 48. The lens array is driven by a rod 50 coupled eccentrically to a crank 52 which is axially driven by a motor (not shown).

Figure 8:
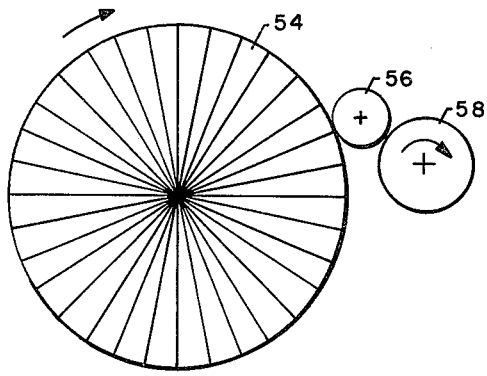
FIG. 8 is an illustration of a rotary lens array drive.

FIG. 8 illustrates a lens array 54 which is rim driven through members 46 and 58 by a motor also not shown. Lens array 54 is similar to the type illustrated in FIG. 6B.

Figure 9:
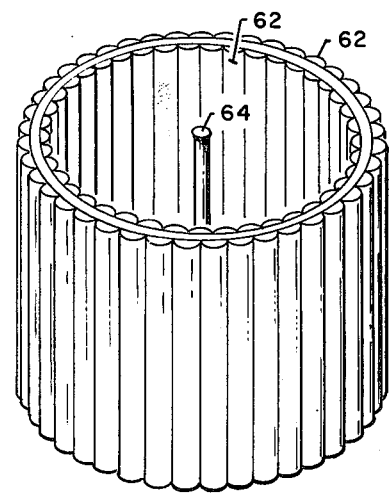
FIG. 9 is an illustration of a concentric light modulator.

FIG. 9 illustrates a concentric lens array comprising an outer cylindrical array 60 and an inner array 62, disposed about a linear light source 64. This type of array can be driven by motors which have their shafts coupled to plates attached to one end of the modulators or can be rim driven.

Masks such as those shown in FIGS. 4 and 5 can be used in place of the outer array 60.

Although certain drives for the lens array modulators have been described, they are shown only for illustration purposes. The linear or oscillating motion modulators can be driven by any oscillating motion mechanism such as a scotch yoke, direct cam, crank and eccentric, four bar linkage and driving motor, hydraulically actuated piston, linear motor, solenoid, etc. The modulators that operate by rotary motion can either be rim driven or center driven by a motor and gear, if required. None of these motion devices is deemed unique and all are well within the skill of the artisan.

Although all the lens arrays illustrated are cylindrical lenses, other shaped lenses can be used to derive different energy distribution patterns and, therefore, different modulating waveforms. Thus, it is to be understood that the embodiments shown are illustrative only and that many variations and modifications may be made without departing from the principles of the invention herein disclosed and defined by the appended claims.

I claim:

1. A modulator for an extended radiation source, comprising:
   a lens array disposed outside the radiation source to concentrate the radiation to form a predetermined energy distribution pattern, the curved surface of said lens array facing the radiation source;
   means disposed outside said lens array for modulating said energy distribution pattern said modulated energy distribution pattern being radiated through said modulating means at certain positions thereof relative to said lens array; and
   means for causing relative motion between said lens array and said modulating means.

2. A modulator as defined in claim 1 wherein:
   said lens array includes a sheet of transparent material of predetermined height having an array of lenses arranged thereon.

3. A modulator as defined in claim 2 wherein:
   said lenses are integral with said transparent sheet.

4. A modulator as defined in claim 2, said transparent sheet leaving opaque portions spaced along the length thereof.

5. A modulator as defined in claim 1 wherein:
   said lenses are cylindrical.

6. A modulator as defined in claim 1 wherein:
   said modulating means includes a second lens array arranged back-to-back with said first lens array.

7. A modulator as defined in claim 1 wherein:
   said modulating means includes a transparent member having a plurality of opaque area spaced thereon.

8. A modulator as defined in claim 1 wherein:
   said modulating means includes an opaque member leaving slots therein.

9. A modulator as defined in claim 1 wherein:
   said modulating means is disposed relative to said lens array such that the spacing between said modulating means and said lens array is minimized.

* * * * *